United States Patent [19]
Figgins

[11] Patent Number: 5,812,050
[45] Date of Patent: Sep. 22, 1998

[54] ELECTRICAL CONTROL APPARATUS WITH UNIDIRECTIONAL TACTILE INDICATOR

[76] Inventor: Daniel S. Figgins, 8028 Popp Rd., Fort Wayne, Ind. 46845

[21] Appl. No.: 768,485

[22] Filed: Dec. 18, 1996

[51] Int. Cl.⁶ .................................................. H04B 3/36
[52] U.S. Cl. ..................................... 340/407.1; 340/407.2; 340/439; 123/396; 123/400; 74/513; 74/526
[58] Field of Search .............................. 340/407.1, 407.2, 340/439; 123/395, 396, 399, 400, 403; 74/512, 513, 526

[56] References Cited

U.S. PATENT DOCUMENTS

| | | | |
|---|---|---|---|
| 2,165,897 | 7/1939 | Liley | 74/526 |
| 2,295,897 | 4/1942 | Gillespie | 74/526 |
| 3,958,542 | 5/1976 | Tanner | 123/396 |
| 4,094,281 | 6/1978 | Kittler | 123/98 |
| 4,117,809 | 10/1978 | Kittler | 123/403 |
| 4,356,471 | 10/1982 | Nienaber | 340/439 |
| 4,510,906 | 4/1985 | Klatt | 123/396 |
| 4,513,235 | 4/1985 | Acklam et al. | 318/685 |
| 4,869,220 | 9/1989 | Imoehl | 123/399 |
| 4,986,238 | 1/1991 | Terazawa | 123/361 |
| 5,265,572 | 11/1993 | Kadomukai et al. | 123/396 |
| 5,429,090 | 7/1995 | Kotchi et al. | 123/396 |
| 5,435,284 | 7/1995 | Shimuzu et al. | 123/396 |
| 5,524,590 | 6/1996 | Jung | 123/400 |

FOREIGN PATENT DOCUMENTS

| | | |
|---|---|---|
| 2649243A1 | 5/1978 | Germany . |
| 4035622A1 | 5/1995 | Germany . |

*Primary Examiner*—Jeffery A. Hofsass
*Assistant Examiner*—Ashok Mannava
*Attorney, Agent, or Firm*—Martin A. Farber

[57] ABSTRACT

A control apparatus produces an electrical signal representative of the position of a manually-operable control member, such as an accelerator pedal. The apparatus includes a rotary member which simulates the position of the control member and which engages a resilient obstruction when it is rotated to a threshold position. This obstruction offers substantial resistance when the rotary member engages it in a first direction, but not when the rotary member engages the obstruction in an opposite second direction.

17 Claims, 7 Drawing Sheets

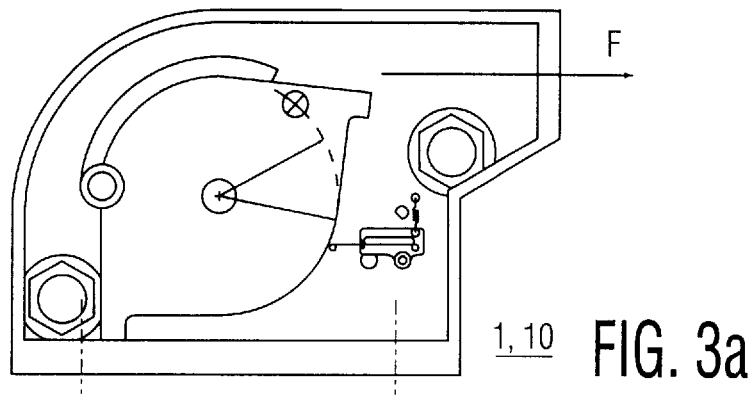
1, 10   FIG. 3a
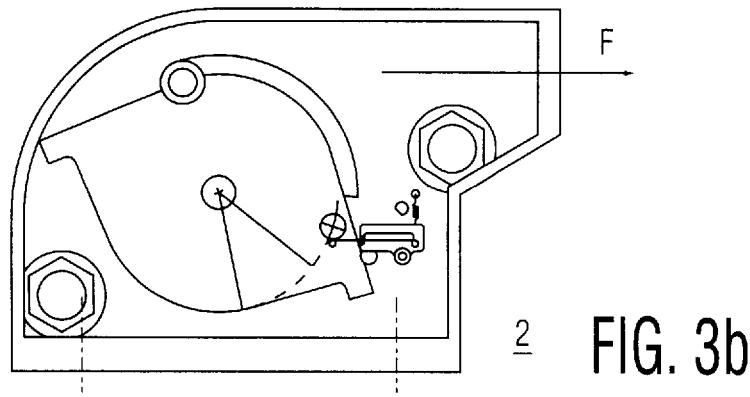
2   FIG. 3b
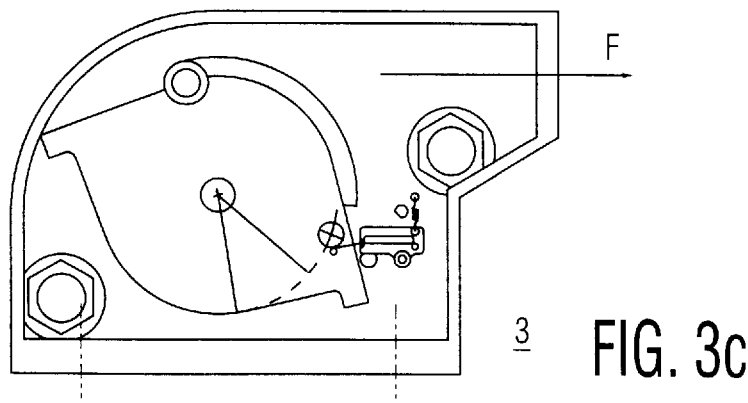
3   FIG. 3c

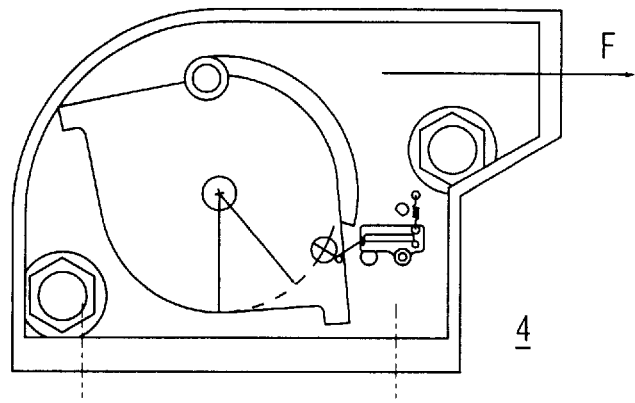
4  FIG. 3d
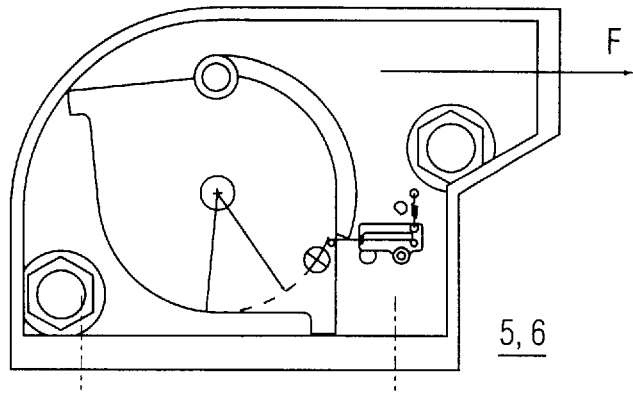
5, 6  FIG. 3e
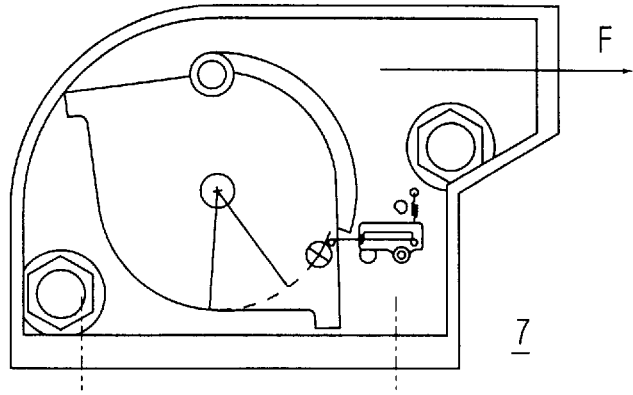
7  FIG. 3f

ELECTRICAL CONTROL APPARATUS WITH UNIDIRECTIONAL TACTILE INDICATOR

BACKGROUND OF THE INVENTION

1. Field of the Invention

This invention relates to a control apparatus for producing an electrical signal representative of the position of a manually-operable control member and, in particular, to such an apparatus including means for unidirectionally giving a tactile indication when the control member has been moved to a threshold position.

2. Description of Related Art

One particularly useful application for such a control apparatus is in state-of-the-art automotive vehicles, where conventional mechanical linkages between control members and the mechanisms being controlled are being replaced by drive-by-wire systems. When this occurs, tactile signals previously communicated to the vehicle operator by the mechanical linkages are lost.

In some cases, these signals provide indications of control member threshold positions which will trigger significant changes in the operation of the controlled mechanisms. One example is an indication of an accelerator pedal kick-down position in automotive vehicles equipped with automatic transmissions. When the accelerator pedal is depressed to this position, the transmission shifts into a passing gear. In conventional vehicles, a tactile indication that this pedal position has been reached is communicated to the operator by the transmission via mechanical linkage between it and the pedal.

U.S. Pat. No. 4,869,220 describes an accelerator control apparatus including a combination of springs for simulating the "feel" of an accelerator pedal in a drive-by-wire system. No means is provided, however, for giving a tactile indication when a threshold position is reached. Further, it is desirable that such an indication be given only when the threshold position is reached and not again when the control member is returned to an initial non-threshold position.

SUMMARY OF THE INVENTION

It is an object of the invention to provide a control apparatus which gives a tactile indication when a control member reaches a threshold position.

It is another object of the invention to provide such a control apparatus which gives such a tactile indication when the control member is moved in one direction to the threshold position, but not when it is moved in the opposite direction.

In accordance with the invention a control apparatus, for producing an electrical signal representative of the position of a movable control member to which it is coupled, includes a rotary member which is rotatable about an axis from a first angular position to a second angular position. Coupling means couples the rotary member to the control member to effect rotation of the rotary member with movement of the control member such that the angular position of the rotary member represents the position of the control member. Biasing means urges the rotary member toward the first angular position against a force to be transmitted by the coupling means from the control member. A first engagement means is attached to the rotary member for movement with the member along a predetermined path. A second engagement means is disposed for obstructing the path by contacting the first engagement means at a predetermined angular position of the rotary member, which corresponds to a threshold position of the control member. One of the first and second engagement means comprises resilient engagement means which substantially opposes passage of the other engagement means when the rotary member is rotated in a first direction to the predetermined angular position, but which insubstantially opposes passage of the other engagement means when the rotary member is rotated in an opposite second direction to the predetermined angular position.

BRIEF DESCRIPTION OF THE DRAWINGS

FIGS. 3a–3h are sequential front views of the first embodiment of the control apparatus, illustrating operation of the embodiment.

DESCRIPTION OF THE PREFERRED EMBODIMENTS

Figure 1:
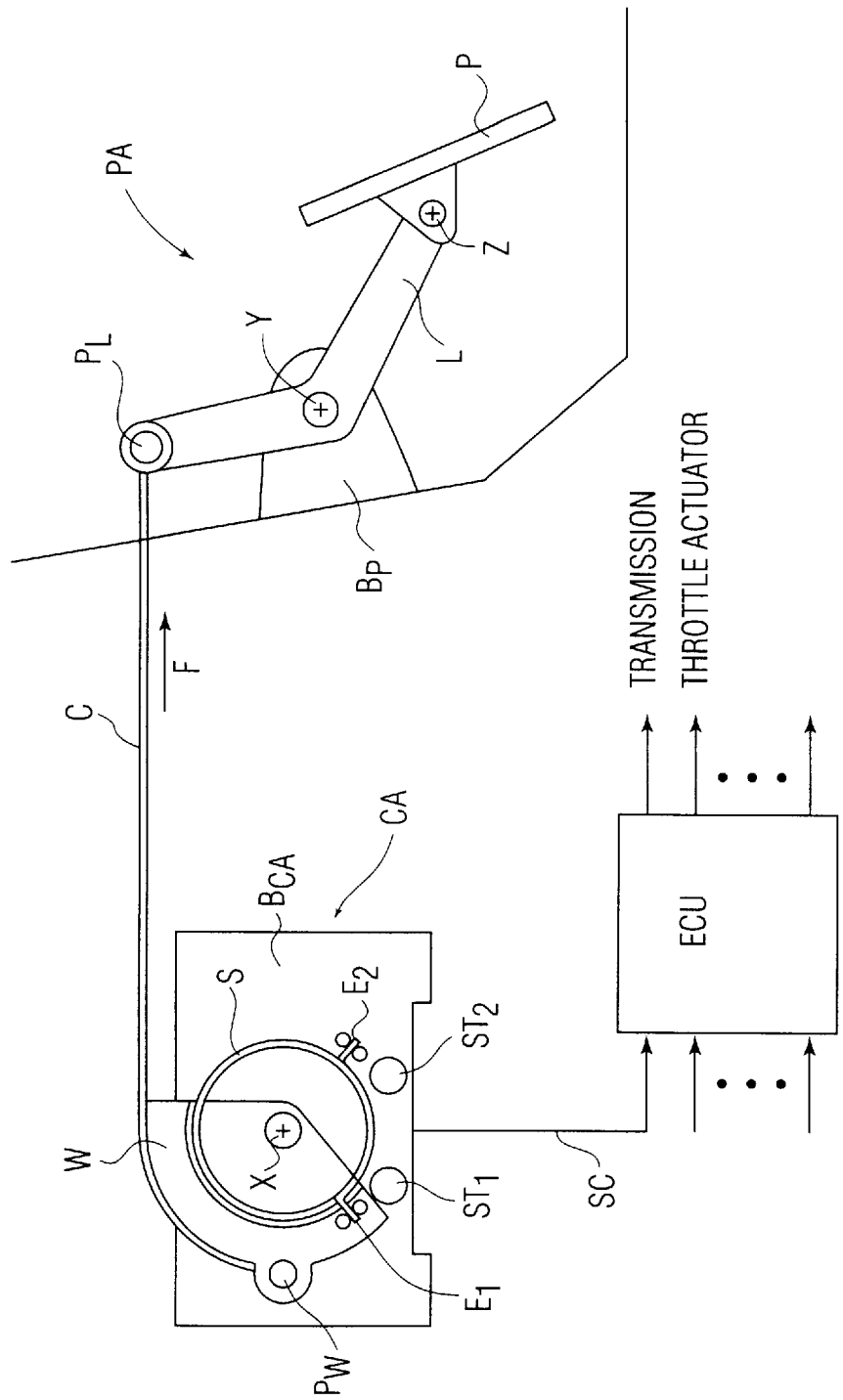
FIG. 1 is a diagram of an exemplary system incorporating a control apparatus in accordance with the invention.

FIG. 1 illustrates an exemplary drive-by-wire system in which a control apparatus in accordance with the invention may be used. The system includes the control apparatus CA, a pedal assembly PA for applying a force F to the control apparatus, and an electronic control unit ECU.

The control apparatus CA includes a cable wheel W and a torsion spring S. The cable wheel is rotatably attached to a fixed bracket $B_{CA}$ for rotation around an axis X between a first stop $ST_1$ and a second stop $ST_2$. The torsion spring S is centered around the axis X, has a radially-extending first end $E_1$ attached to the cable wheel W between a first pair of axially-extending pins and has a second end $E_2$ attached to the bracket $B_{CA}$ between a second pair of axially-extending pins. This spring biases the cable wheel in a counter-clockwise direction around the axis X to the position shown in FIG. 1.

The pedal assembly PA includes a bent lever L and a pedal P. The lever is pivotally attached to a fixed bracket $B_P$ for pivoting about an axis Y. Similarly, the pedal P is pivotally attached to one end of the lever L for pivoting around an axis Z. An opposite end of the lever is connected to the cable wheel W via a cable C for transmitting the force F to the wheel. This cable has one end attached to a pin $P_L$ at the end of the lever, extends around an arc-shaped portion of the wheel, and has an opposite end attached to a pin $P_W$ in the wheel. Although not shown in FIG. 1, spring means are provided for biasing the end of the lever L with the pin $P_L$ away from the control apparatus CA.

The electronic control unit ECU includes a number of inputs, for receiving signals from vehicle sensors, and a number of outputs for transmitting signals to vehicle components controlled by the unit. In this example, one of the inputs is electrically connected to the control apparatus CA, via a signal cable SC, for receiving a throttle signal having a magnitude representing the angular position of the cable wheel W (and also of the pedal P). The throttle signal is produced by a sensor (not shown), such as a potentiometer which is attached to the bracket $B_{CA}$ and includes a shaft coupled to the cable wheel for rotation about the axis X with the wheel. In response to the magnitude of the throttle signal, the electronic control unit transmits a signal to a throttle actuator for controlling engine speed. Additionally, when the magnitude of the throttle signal indicates that the vehicle operator has depressed the pedal P to a threshold position, to demand maximum acceleration, the electronic control unit transmits a kick-down signal to the automatic transmission to effect shifting into a passing gear.

Figure 2:
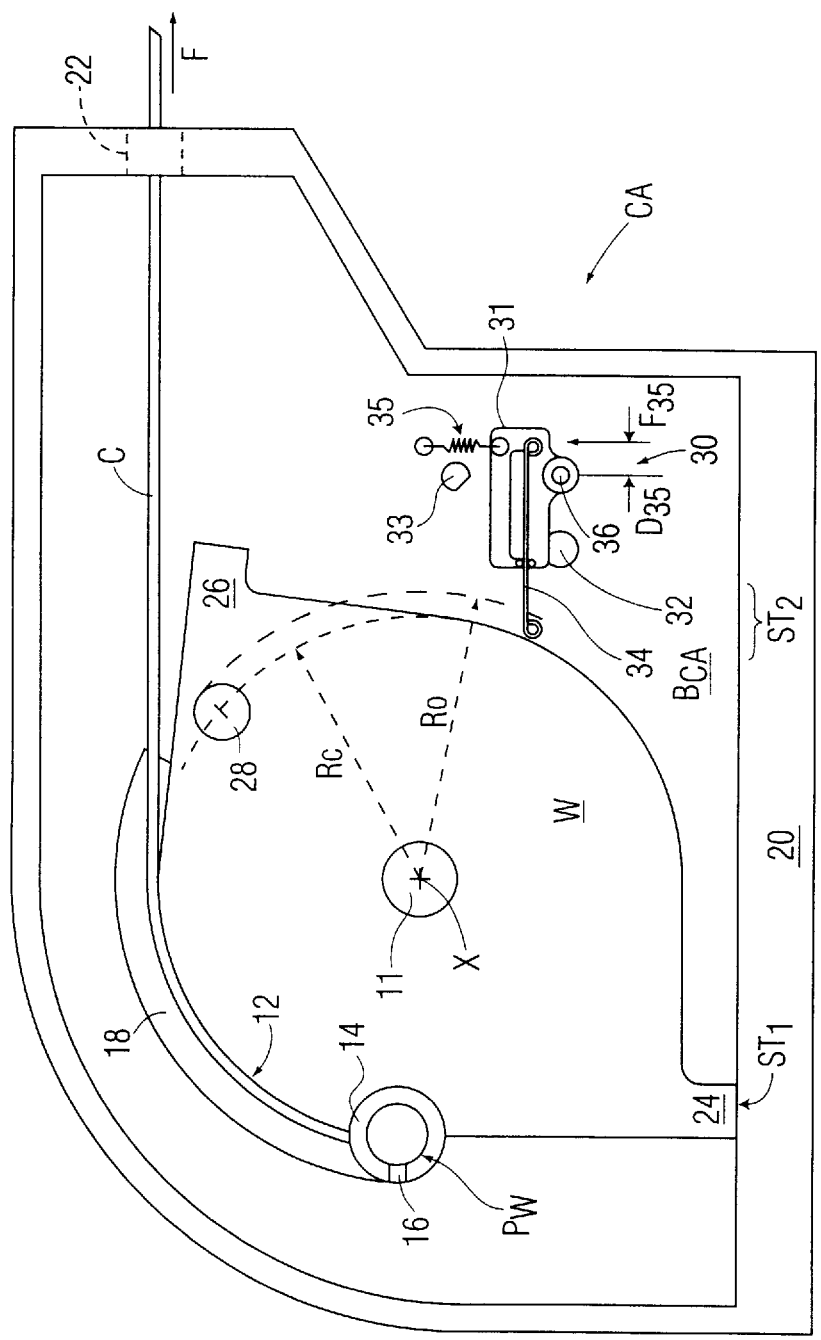
FIG. 2 is a front view of a first embodiment of a control apparatus in accordance with the invention.

FIG. 2 illustrates, in greater detail than FIG. 1, a first embodiment of the control apparatus CA. In this embodiment, the cable wheel W is rotatably mounted about a shaft 11 which is rigidly attached to the bracket $B_{CA}$. The cable wheel includes a grooved rim 12 around which the cable C is guided to an annular collar 14 in which the attachment pin $P_W$ is secured. This collar includes a notch 16 through which the cable C can be passed when inserting the attached pin $P_W$ into the collar 14. The cable wheel W also includes a backplate 18, for guiding the cable C onto the rim, and preferably further includes a corresponding frontplate (not shown) for keeping the cable from sliding off of the front side of the rim 12. The torsion spring S is not shown in this figure, but is disposed between the cable wheel and the bracket.

The bracket $B_{CA}$ serves both as a means for mounting the control apparatus CA and as a back wall of a housing for the cable wheel and associated means for producing the tactile indication when the control member (the pedal P in this example) is moved to the threshold position. This housing also includes a circumferential side wall 20 which extends from the bracket and includes a guide hole 22 through which the cable C passes to the control member. The side wall 20 also includes inner surface portions which serve as the first and second stops $ST_1$ and $ST_2$ for flat-ended projections 24 and 26, respectively, of the cable wheel W.

The means for producing the tactile indication of the threshold position include first and second engagement means 28 and 30, respectively. The first engagement means 28 comprises a pin which extends axially through the cable wheel W and has a center and a radially outward surface which describe arcs with radii $R_c$ and $R_o$, respectively, as the wheel rotates about the axis X. These arcs bound a path of the pin 28 which is obstructed by the second engagement means 30.

The second engagement means comprises a rotatable bracket 31, a first stop 32, a second stop 33, a leaf spring 34 and a tension spring 35. Each of the stops 32 and 33 comprises a pin which extends from, and is rigidly attached to, the bracket $B_{CA}$. The bracket 31 is rotatable about a pin 36, which extends from the bracket $B_{CA}$, and securely holds a substantial length of the leaf spring 34. The tension spring 35 has one end attached to the bracket $B_{CA}$ and an opposite end attached to the bracket 31 such that it applies a force $F_{35}$, at a moment-arm distance $D_{35}$, to the bracket 31. This force holds the rotatable bracket 31 against the first stop 32 such that a looped end of the leaf spring 34 extends into the path of the pin 28. The second stop 33 limits travel of the bracket 31 during operation.

Figure 3G:
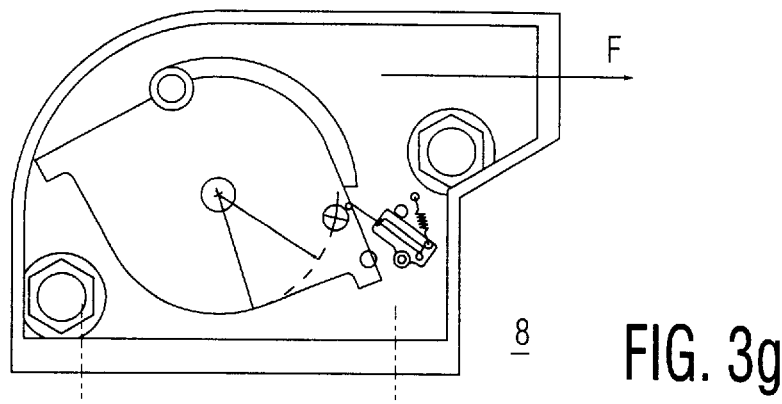
Figure 3H:
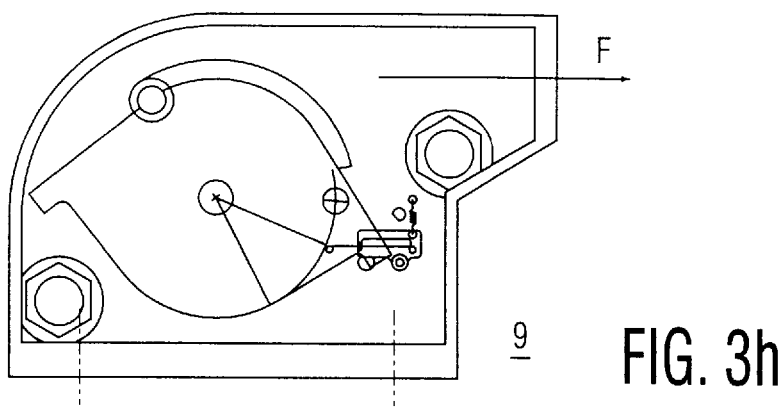
Figure 4:
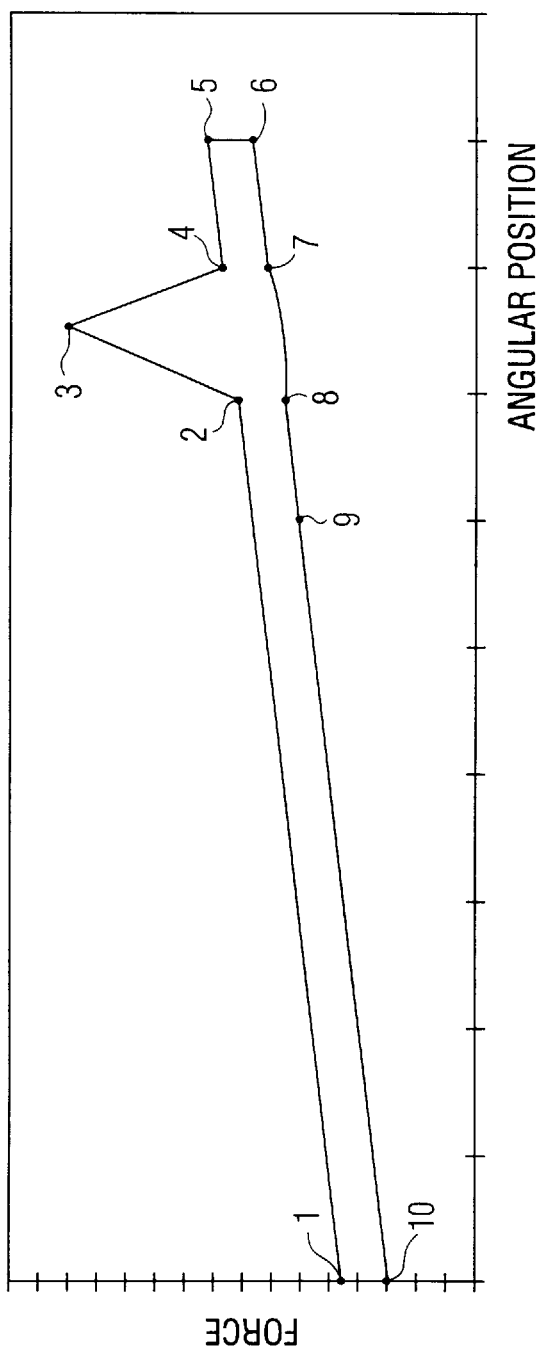
FIG. 4 is a graph showing forces produced by the control apparatus during operation.

FIGS. 3 and 4 illustrate operation of the control apparatus of FIG. 2. Initially, the cable wheel W is in the position shown in FIG. 3a, which corresponds to the position shown in FIG. 2. In this position, the projection 24 is held against the stop $ST_1$ by the force indicated at point 10 in FIG. 4, which is developed by the torsion spring S shown in FIG. 1. In order to overcome friction and begin the cable wheel rotating, the force F must be increased to the magnitude indicated at point 1 in FIG. 4.

As the force F is increased, to overcome a linearly-increasing force developed by the torsion spring S, the wheel W rotates to the position indicated at point 2 (FIG. 4), which is shown in FIG. 3b. In this position, which is the threshold position, the pin 28 contacts the end of leaf spring 34 and the force F must be substantially increased (approximately doubled in this example) to bend the leaf spring sufficiently to rotate the wheel to the position indicated at point 3 and shown in FIG. 3c. At this position, the pin 28 slides across the looped end of the leaf spring 34. The force F needed to continue rotating the wheel W suddenly decreases to the magnitude indicated at point 4 as the wheel rotates to the position shown in FIG. 3d. To continue rotating the wheel to the position where the projection 26 contacts the stop $ST_2$ (FIG. 3e), the force F must be increased to the magnitude indicated at point 5.

As is shown in the graph of FIG. 4, the force vs. position curve of the control apparatus CA exhibits hysteresis. In order to begin the pin 28 on its return path, the force F first must be reduced to the magnitude indicated at point 6. This reduction occurs because, when cooperating with the force of rotation applied by the torsion spring S, this spring itself overcomes friction.

As the force F is reduced to that indicated at point 7, the wheel W rotates to the position (FIG. 3f) where pin 26 once again contacts the leaf spring 34. Since the wheel is rotating in a counter-clockwise direction, however, the leaf spring and the bracket 31 are free to rotate as a unit, about pin 36, against the force $F_{35}$ applied by tension spring 35. This force need only be sufficient to return the rotatable bracket 31 to its position against stop 32, and this force is much smaller than that exerted by the leaf spring 34 on the pin 28 at position 3. Further, the moment arm for this force, having the distance $D_{35}$, is several times smaller than the moment arm extending from pin 36 to the looped end of the leaf spring 34. By appropriately selecting the spring 35 and the ratio of these two moment arms, the change in the force F needed to effect rotation of the wheel W from the position indicated at point 7 to that indicated at point 8 (FIG. 3g) can be made to decrease substantially linearly at a slope approximating that of the spring force produced by the torsion spring S.

By further decreasing the force F, the angular position of the wheel W continues to change linearly. The wheel passes through the position shown in FIG. 3h when the force F has the magnitude indicated at point 9, and finally returns to the position shown in FIG. 3a as the force F is reduced to the magnitude indicated at point 10.

Figure 5:
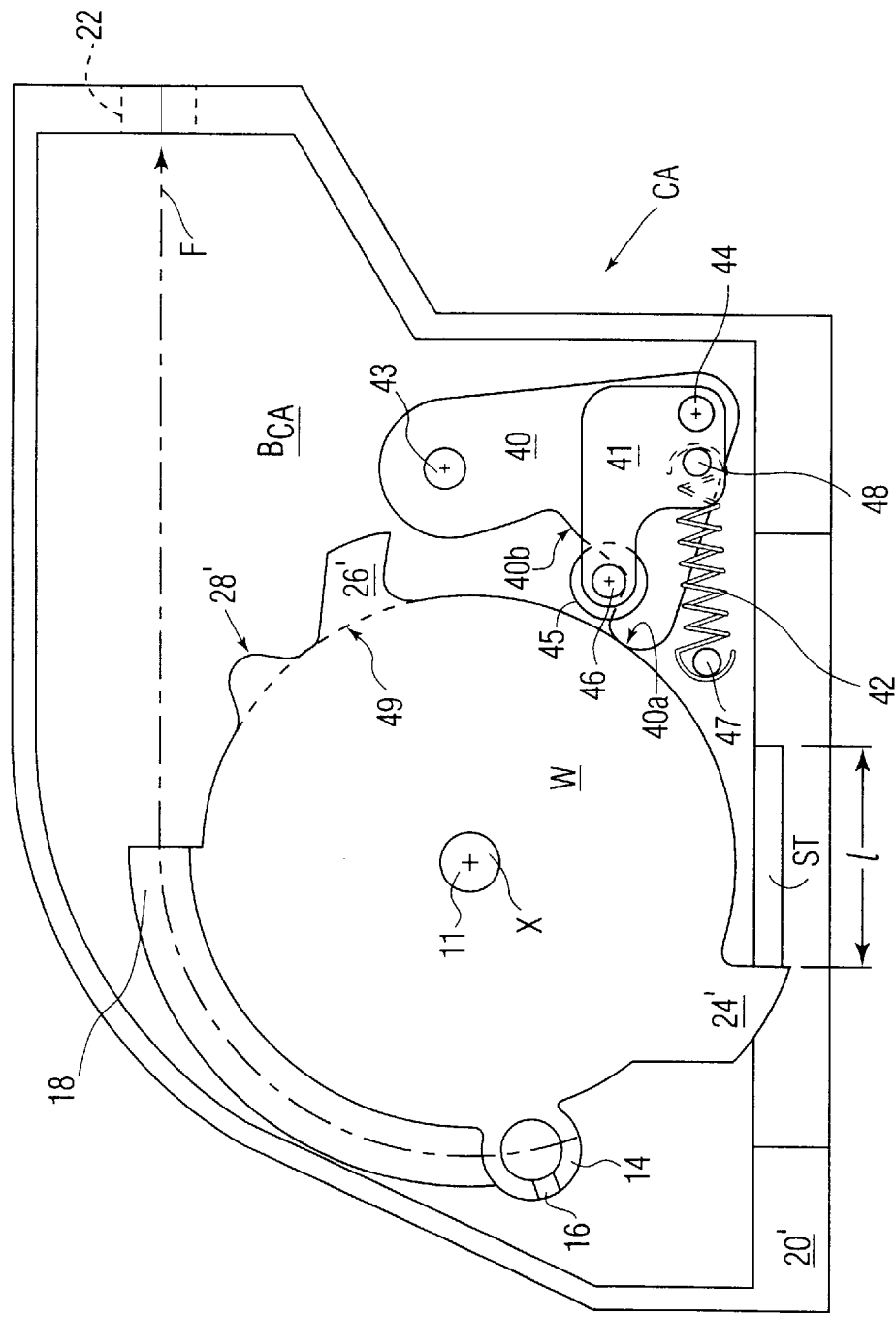
FIG. 5 is a front view of a second embodiment of a control apparatus in accordance with the invention.

FIG. 5 shows a second embodiment of the control apparatus CA, which has a simpler and higher reliability, single-spring means for producing a tactile indication of the threshold position. It also provides means for more easily adapting the angular range of rotation of the wheel W to meet design requirements for different applications.

This embodiment includes many parts which are substantially identical to those of the first embodiment. These parts are identically numbered. The cable wheel W differs from that of the first embodiment in two significant respects. One difference is the use of projections 24' and 26' which pass through respective slots in a circumferential side wall 20' to contact opposite ends of a stop ST. By simply changing the length l of this stop, the angular range of rotation of the wheel can be changed to meet design requirements for different applications. Another difference is the use of a cam 28' for the first engagement means. The profile of this cam can be readily modified to adjust the shape of the force vs. angular position curve at the threshold position.

As is shown in FIG. 5, the second engagement means comprises first and second, generally L-shaped, pivot arms 40 and 41, respectively, and a tension spring 42. The first pivot arm 40 includes a stop surface 40a and a cam surface 40b and is mounted for pivoting around the axis of a pin 43. The second pivot arm 41 is mounted for pivoting around the axis of a pin 44, that is secured to the pivot arm 40, and includes a roller 45 which is mounted for rotation about the axis of a pin 46 that is secured in a hole in the arm 41 and extends back sufficiently far to contact the cam surface 40b. The tension spring 42 has opposite ends secured to a pin 47 (extending from the bracket $B_{CA}$) and to a pin 48 (secured to the pivot arm 41).

When in the rest position shown in FIG. 5, the single spring 42 directly pulls on arm 41 to hold pin 46 against the bottom of cam surface 40b. Further, spring 42 indirectly pulls on arm 40 (via the connection of arm 41 to arm 40 by pin 44) to hold stop surface 40a against a curved rear surface 49 extending from the bracket $B_{CA}$. This surface lies directly behind the circumference of cable wheel W.

Operation of the embodiment of FIG. 5 is also generally illustrated by FIG. 4. During rotation of the wheel in the clockwise direction, cam 28' contacts roller 45 at the threshold position (point 2) and pushes pin 46 downwardly against cam surface 40b, causing arm 40 to rotate about the axis of pin 43 against the force of the spring 42. The moment arm about the axis of pin 43 for the force applied to pin 48 by the spring is substantially larger than that for the force applied to pin 46 by the cam 28'. When the wheel is rotated to the position indicated by point 4, the cam 28' clears the roller 45 and the stop surface 40a returns to its contact with surface 49. At the position indicated by point 5, the projection 26' contacts the right end of stop ST.

During return of the wheel to the rest position by counterclockwise rotation, the cam 28' again contacts roller 45. In this direction, however, arm 41 is free to rotate around the axis of pin 44 without moving arm 40. The moment arm about this axis for the force applied to pin 48 by the spring is much smaller than that for the force applied to pin 46 by the cam 28'.

Although preferred embodiments of a control apparatus in accordance with the invention have been described in detail, many alternative constructions can be made. For example, the apparatus need not be coupled to a movable control member via a cable. This function could be performed equally well via alternative means such as a shaft extending along axis X which is directly or indirectly coupled to the control member. As another alternative, rather than using a cable, the wheel W could be connected to the control member via a bellcrank having a first rod extending to the collar 14 and having a second rod extending to the control member.

I claim:

1. A control apparatus for producing an electrical signal representative of the position of a movable control member to which it is coupled, said apparatus comprising:
    a. a rotary member rotatable about an axis from a first angular position to a second angular position;
    b. coupling means for coupling the rotary member to the control member to effect rotation of the rotary member with movement of the control member, such that the angular position of the rotary member represents the position of the control member;
    c. biasing means for urging the rotary member toward the first angular position against a force to be transmitted by the coupling means from the control member;
    d. first engagement means attached to the rotary member for movement with said member along a predetermined path; and
    e. second engagement means disposed for obstructing said path by contacting the first engagement means at a predetermined angular position of the rotary member corresponding to a threshold position of the control member,
    one of said first and second engagement means comprising resilient engagement means which substantially opposes passage of the other engagement means when the rotary member is rotated in a first direction to the predetermined angular position and which allows the other engagement means to traverse beyond said resilient engagement means such that said resilient engagement means produces substantially no opposition to movement by the other engagement means, but which insubstantially opposes passage of the other engagement means when the rotary member is rotated in an opposite second direction to the predetermined angular position.

2. A control apparatus as in claim 1, wherein the movable control member comprises an accelerator pedal.

3. A control apparatus as in claim 1, wherein the rotary member comprises a spring-biased cable wheel and wherein the coupling means comprises a cable attached to said wheel.

4. A control apparatus as in claim 1, wherein the biasing means comprises a spring.

5. A control apparatus as in claim 1 where the predetermined path lies along an arc disposed at a predetermined radius from the axis.

6. A control apparatus according to claim 1, further comprising a housing for housing said rotary member, said housing including first and second stops for terminating movement of said rotary member in said first and second directions, respectively.

7. A control apparatus according to claim 1, wherein the other engagement means comprises a pin extending through said rotary member, and
    wherein said resilient engagement means comprises a rotatable bracket, first and second stops rigidly attached to said bracket, a leaf spring attached to said bracket, and a tension spring attached to said bracket, for applying a force to said bracket for holding said bracket against said first stop, such that a first end of the leaf spring extends into a path of said pin,
    wherein said second stop limits movement of said bracket.

8. A control apparatus according to claim 1, wherein said resilient engagement means imparts substantially no force on the other engagement means after said other engagement means has rotated beyond said resilient engagement means.

9. A control apparatus according to claim 1, wherein said other engagement means comprises a cam member, and
    wherein said resilient engagement means comprises first and second pivot arms, coupled together and for receiving said cam member, and a tension spring coupled to one of said first and second pivot arms.

10. A control apparatus for producing an electrical signal representative of the position of a movable control member to which it is coupled, said apparatus comprising:
    a. a rotary member rotatable about an axis from a first angular position to a second angular position;
    b. coupling means for coupling the rotary member to the control member to effect rotation of the rotary member with movement of the control member, such that the angular position of the rotary member represents the position of the control member;

c. biasing means for urging the rotary member toward the first angular position against a force to be transmitted by the coupling means from the control member;

d. first engagement means attached to the rotary member for movement with said member along a predetermined path; and e. second engagement means disposed for obstructing said path by contacting the first engagement means at a predetermined angular position of the rotary member corresponding to a threshold position of the control member, one of said first and second engagement means comprising resilient engagement means which substantially opposes passage of the other engagement means when the rotary member is rotated in a first direction to the predetermined angular position, but which insubstantially opposes passage of the other engagement means when the rotary member is rotated in an opposite second direction to the predetermined angular position, wherein said one of said first and second engagement means comprises:

a contact member which is movable relative to the predetermined path when it is contacted by the other engagement means;

first spring means for resiliently urging the contact member against said other engagement means with a substantial force when the rotary member is rotated in the first direction; and second spring means for resiliently urging the contact member against said other engagement means with an insubstantial force when the rotary member is rotated in the second direction.

11. A control apparatus for producing an electrical signal representative of the position of a movable control member to which it is coupled, said apparatus comprising:

a. a rotary member rotatable about an axis from a first angular position to a second angular position;

b. coupling means for coupling the rotary member to the control member to effect rotation of the rotary member with movement of the control member, such that the angular position of the rotary member represents the position of the control member;

c. biasing means for urging the rotary member toward the first angular position against a force to be transmitted by the coupling means from the control member;

d. first engagement means attached to the rotary member for movement with said member along a predetermined path; and e. second engagement means disposed for obstructing said path by contacting the first engagement means at a predetermined angular position of the rotary member corresponding to a threshold position of the control member, one of said first and second engagement means comprising resilient engagement means which substantially opposes passage of the other engagement means when the rotary member is rotated in a first direction to the predetermined angular position, but which insubstantially opposes passage of the other engagement means when the rotary member is rotated in an opposite second direction to the predetermined angular position, wherein said one of said first and second engagement means comprises:

a contact member which is movable relative to the predetermined path when it is contacted by the other engagement means;

a first member, rotatable about a first axis against a substantial first moment, for resiliently urging the contact member against said other engagement means with a substantial force when the rotary member is rotated in the first direction; and a second member, rotatable about a second axis against an insubstantial second moment, for resiliently urging the contact member against said other engagement means with an insubstantial force when the rotary member is rotated in the second direction.

12. A control apparatus as in claim 11 where the first and second moments are produced by the force of a common spring.

13. A control apparatus as in claim 11 where the second member is pivotally attached to the first member for rotation about the second axis.

14. A control apparatus as in claim 10 or 11 where the movable control member comprises an accelerator pedal.

15. A control apparatus as in claim 10 or 11 where the rotary member comprises a spring-biased cable wheel and where the coupling means comprises a cable attached to said wheel.

16. A control apparatus as in claim 10 or 11 where the biasing means comprises a spring.

17. A control apparatus as in claim 10 or 11 where the predetermined path lies along an arc disposed at a predetermined radius from the axis.

* * * * *